July 24, 1956

F. STRAZNICKY 2,755,639

EVAPORATING DEVICE, PARTICULARLY FOR
REFRIGERATORS IN MOTOR VEHICLES

Filed Nov. 15, 1952

INVENTOR

FEDOR STRAZNICKY

BY

ATTORNEY

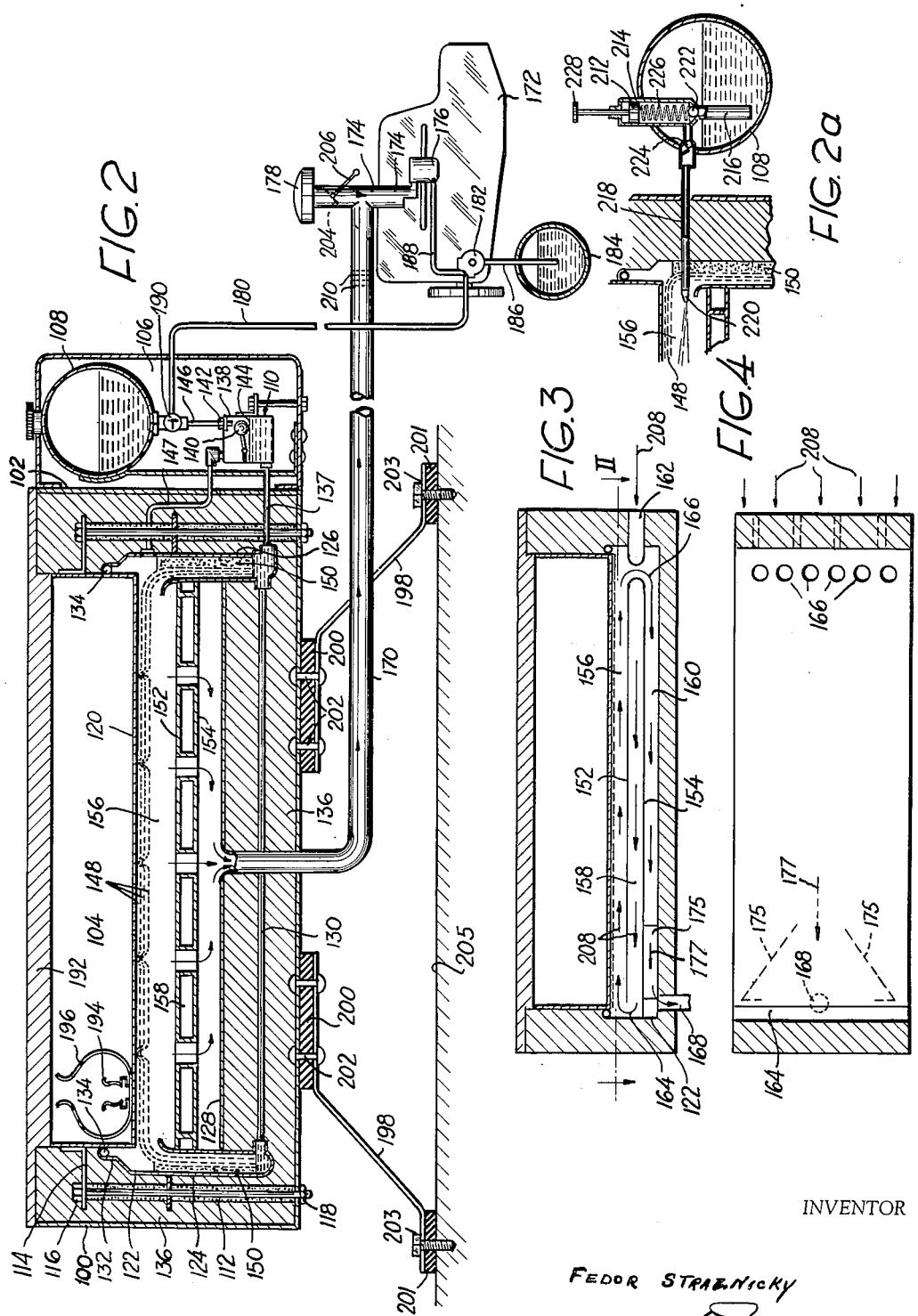

United States Patent Office 2,755,639
Patented July 24, 1956

2,755,639

EVAPORATING DEVICE, PARTICULARLY FOR REFRIGERATORS IN MOTOR VEHICLES

Fedor Straznicky, Solna, Sweden

Application November 15, 1952, Serial No. 320,759

Claims priority, application Sweden December 7, 1951

9 Claims. (Cl. 62—169)

My invention relates to apparatus for producing refrigeration in connection with internal combustion engines and similar machines, which are either stationary or employed for driving or propelling automobiles, motor boats, motor vehicles, or the like.

It has been proposed to produce refrigeration in connection with internal combustion engines wherein the expansion of fluid fuel is utilized to produce cold, and the fuel is subsequently introduced into the engine.

It is an object of the invention to provide an evaporation device in combination with a refrigeration apparatus for storing and cooling food and potions in motor vehicles of various types.

A further object of the invention is to provide an evaporating device capable of operating for refrigeration and at the same time serving as or completing the carburetor of an internal combustion engine.

A still further object of the invention is to provide an improved evaporation device for refrigerators based on the principle of vaporization of liquid from a body or member fed with liquid for the vaporization by capillary action.

My invention, together with the above and other objects and advantages thereof, will be more fully understood upon reference to the following description and the accompanying drawings forming part of this specification, and of which:

Fig. 2 is a transverse vertical section of a further embodiment of the invention, an internal combustion engine and the connections therewith being included and shown diagrammatically on a reduced scale.

Fig. 2a is a vertical section of a detail.

Fig. 3 is a vertical section on a reduced scale and by diagrammatical representation of the refrigerator per se with its evaporating device and a pre-cooler combined therewith, Fig. 4 is a horizontal section substantially on lines IV—IV in Fig. 3.

Figure 1:
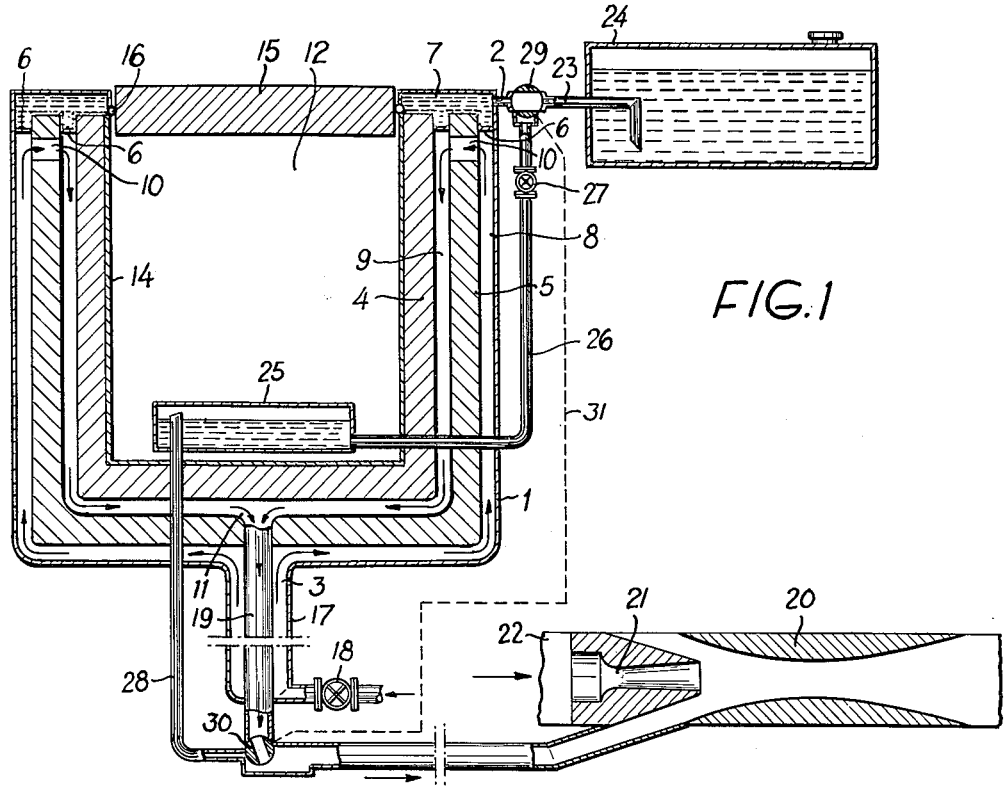
Fig. 1 is a vertical section of a diagrammatically illustrated refrigeration apparatus embodying the invention.

As shown in the drawing a shell 1 with a liquid inlet 2 at the top and an air intake 3 at the bottom encloses porous bodies in the form of two boxes 4, 5 mounted one within the other, said boxes being made for example from ceramic material. The top of the shell is divided by a horizontal partition 6 into two chambers, viz. one liquid chamber 7 above the partition 6 and one vapor chamber therebelow. The vapor chamber has an outer compartment 8 in the space between the shell 1 and the exterior box-like body 5 and an inner compartment 9 in the space between the two boxes 4, 5 mounted one in the other. The outer vapor compartment 8 which has the air inlet 3 at the bottom thereof communicates with the inner vapor chamber 9 by apertures 10 near the top of the outer box 5, and the inner vapor compartment 9 is provided with an outlet 11 for a mixture of air and vapor, said outlet extending from the bottom of the exterior box 5. The top edges of the boxes project through the partition 6 up into the liquid chamber 7 so as to be able to suck liquid therefrom. Within the interior box 4 is a refrigerator cabinet 12 suitably lined with walls 14 of copper or any other well heat-conducting material adjacent the interior wall of the box 4. The refrigerator cabinet 12 is open at a top but may be covered by a lid 15. A heat-insulating packing 16 may be mounted at the top of the wall of the refrigerator cabinet so as to insulate it for preventing heat transfer from the shell 1.

Connected to the air inlet 3 is a duct 17 with a control valve 18 enabling variation of the amount of air admitted to the shell 1. Connected to the outlet 11 is a conduit or tube 19 which extends through the duct 17 and forms, together with the latter, a heat exchanger in which the air entering through the duct 17 is cooled by the air-vapor mixture escaping through the conduit 19.

In order to obtain a positively propelled flow of air through the vapor compartments 8, 9 the conduit 19 may be connected to a suitable suction member, in the illustrated embodiment comprising an ejector 20 with a driving nozzle 21 communicating with a supply conduit 22 for a suitable propelling medium. The outlet of said ejector is adapted to be connected with or the ejector may be replaced by the air intake of an internal combustion engine in which the air-vapor mixture is utilized as a fuel mixture for the engine, as in the second embodiment referred to hereinafter.

Liquid is supplied to the liquid chamber 7 by a conduit 23 from a liquid tank 24. The latter may be located partly or as a whole at a level above the liquid chamber 7 so that a certain pressure prevails in the latter and the liquid is able to flow therefrom by gravity. If desired, the liquid may be pumped to the liquid chamber by a suitable pump. The distribution of the liquid in the porous bodies may be facilitated by tubes or passages mounted therein and permitting the liquid to flow from the liquid chamber 7 to various points in the material.

Should the refrigeration effect obtained by the vaporization from the porous bodies 4, 5 in the vapor compartments 8, 9 be considered insufficient, an additional refrigerating device may be provided in or adjacent the refrigerator cabinet 12, said device being shown in the drawing as an evaporator in the form of a container 25 in which vacuum may be applied. The evaporator can operate with the same refrigerating medium as the porous bodies but it is also possible to connect the evaporator with a separate tank for a refrigerating medium enabling a more efficient refrigeration. In the illustrated embodiment the tank 25 is connected with the liquid inlet conduit 23 by a conduit 26 which comprises an expansion valve 27. The vapor chamber of the evaporator is connected, by a conduit 28, with a suction device, for example, the same ejector 20 which sucks air-vapor mixture through the conduit 19 from the outlet 11.

In order to enable operation of the refrigerating apparatus with or without the additional evaporator 25 a shifting valve 29 may be mounted in the liquid inlet conduit 23 and a shifting valve 30 at the point of connection of the conduit 28 with the conduit 19. As indicated by the dotted line 31, these shifting valves may suitably be connected with one another to be operated in common and shifted simultaneously. The valve 29 is constructed so as to permit a more or less open communication between the liquid inlet conduit 23 and the evaporator 25 or closing of said communication, and analogously the valve 30 is mounted so as to enable escape either through the conduit 19 or through the conduit 28 or through both at the same time in a variable relation.

The operation of the described refrigerating apparatus is substantially as follows.

During operation of the ejector 20 and supply of driving fluid through the conduit 22 a suction effect is generated in the vapor compartment 8, 9, whereby air is drawn through the duct 17 and the air inlet 3 into the outer vapor compartment 8. The flow of air here created passes along the exterior wall of the box 5, passes the apertures 10 to enter the inner vapor compartment and moves along the opposite walls of the boxes 4, 5 to escape through the outlet 11. The boxes 4, 5 are maintained in a moist condition by the liquid which is absorbed by the top portions of the boxes 4, 5 from the liquid chamber 7, whereby a thorough evaporation takes place from the walls the boxes 4, 5 in contact with the flow of air. Thus the flow of air will entrain vapor to an amount corresponding to the evaporation from the porous material. As a result of the evaporation the temperature is lowered in this material and thus in the refrigerator cabinet 12 located in the inner box 4. The temperature of the entering air is lowered initially already in the heat exchanger consisting of the conduits 17, 19, heat being taken and transferred through the wall of the conduit 19 by the cold mixture of air and vapor escaping through said conduit. The quantity of entering air and thus the refrigerating effect can be controlled by the valve 18 in the air inlet of the duct 17.

The shifting valves 29, 30 shown in the drawing are set to a position, in which the liquid inlet conduit 26 to the evaporator 25 is closed as well as the connection between the suction conduit 28 from the evaporator and the outlet conduit 19 from the vapor compartment 9. The evaporator thus is idle. Should it be desired to lower the temperature further in the refrigerator cabinet 12, the valves 29, 30 may be set so as to open the communications to the conduits 26 and 28 to a variable extent. As a result, vaporization also is initiated in the evaporator due to the vacuum occurring in the evaporator by the suction in the conduit 28, whereby the temperature of the evaporator is reduced.

The porous moist bodies are mounted in series accounted in the direction of the flow of air, whereby vapor may be received by the air to an essential extent and a good refrigerating effect is obtained. A plurality of porous bodies may be mounted in succession or one in the other to a suitable extent. Should the refrigerating apparatus be employed in a vehicle, driven by an internal combustion engine, the exhaust gases from the engine may be employed for the operation of the ejector or the outlet conduit 19, but preferably said conduit is connected with the air intake of the engine so that the air flow through the vapor compartments is generated by the suction effect arising thereby and the air-vapor mixture may be utilized for driving the engine. A more efficient apparatus of great capacity will be described hereinafter, the connections with the internal combustion engine being specified and illustrated.

Figure 5:
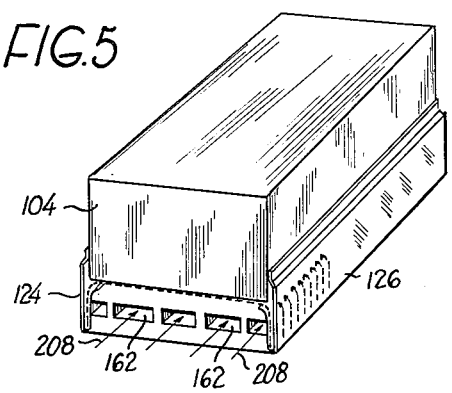
Fig. 5 is a perspective view corresponding to Figs. 3 and 4 and illustrating the air intake side of the evaporator.

In the embodiment shown in Figs. 2–5, the apparatus comprises an outer shell 100 divided into two compartments by a partition 102, i. e. one compartment enclosing a refrigerating cabinet or box 104, evaporating means for the refrigerating fluid and a pre-cooler, and another compartment 106 enclosing a refrigerating liquid tank 108 and level control means 110.

The box 104 which is made from sheet metal is supported by rods 112 and by heat insulating tubes surrounding the rods and forming spacing members bearing on the bottom of the shell 100 and carrying, on their tops, brackets 114, secured to the side walls of the box 104. Nuts 116, 118 at the screw-threaded ends of the rods complete the connection between said bottom and said brackets.

Located beneath the bottom 120 of the box 104 within the shell 100 is a casing 122 enclosing the evaporating and pre-cooling means. Channel-shaped reservoirs 124, 126 form the end walls of said casing, the bottom of which is designated with 128. The bottoms of the reservoirs 124, 126 communicate through one or more tubes or conduits 130 with one another. The top edges 132 of the outer wall of the channel-shaped reservoirs 124, 126 overlap the sides of the box 104 and extend inward, a packing 134 being mounted between the top 132 and said side walls to form a seal whereby the space within the casing 122 is closed to prevent the vapor of the vaporized refrigerating fluid to escape into the space between the outer shell and the casing 122. The latter space is filled up with a heat insulating material 136 which also surrounds the sides of the box 104.

The bottom of the reservoir 126 has an inlet for liquid at the bottom, communicating through a pipe 137 with a container 138 enclosing the level control means 110. The level control means comprises a float 140 cooperating with a liquid inlet valve 142 at the top of the container 138 to admit liquid thereinto as the liquid level 144 sinks below a predetermined value. The inlet valve 142 controls the supply of liquid through a supply conduit 146 from the liquid tank 108 referred to above. The space above the liquid level in the container 138 is connected with the inner of the casing 122, whereby the same pressure is maintained in the container and in the casing so as to facilitate the flow of liquid into the reservoir 126.

Mounted in the casing 122 in intimate contact with the bottom 120 of the box 104 is a liquid absorbent material comprising a plurality of sheets 148 in superimposed position, opposite margins of said sheets depending through the channel-shaped reservoirs 124, 126 into the liquid contained at the bottom thereof. The consistency of this absorbent material has proved to be of particular importance to the capacity of the refrigerating apparatus and the cooling effect obtainable thereby. Generally, any material capable of elevating and distributing liquid fuel such as gasoline would be possible, for example, ceramic or fibrous substances but a more rapid vaporization and accelerated refrigeration may be obtained by using a well heat-conducting material such as a wire netting of a sufficiently fine mesh for example a Phosphor-bronze netting with 100 mesh per inch and a wire thickness of 0.0043 inch. A liquid distributing member such as a wick 150 of porous material immerses into the liquid in the reservoirs 124, 126 and is held in contact with the depending parts of the wire members 148 to improve the supply of liquid to said members and to facilitate the distribution thereof over an augmented surface and also to prevent splashing.

The apparatus may comprise a pre-cooler or cool-exchanger adapted to provide a preliminary cooling of the air admitted into the apparatus. This pre-cooler is illustrated as formed by two superimposed and spaced partitions 152, 154, dividing the inner of the casing 122 into three chambers, 156, 158 and 160. The central one of said chambers may be termed the pre-cooling chamber, the topmost one containing the wire netting 156 the evaporation chamber and the lowest one the exhaust chamber 160. The pre-cooling chamber 158 is provided with an inlet or a plurality of inlets 162 in open or controlled communication with the outer atmosphere and communicates with the evaporation chamber 156 by a passage 164 located at the opposite end of the casing 122 as compared with the air inlet. Located near the same end as the air inlets are a plurality of passages 166 formed by tubes extending vertically through the pre-cooling chamber 158 into the exhaust chamber 160. This chamber has an outlet 168 connected by a conduit 170 with the air intake 174 of an internal combustion engine 172 for example for a motor vehicle. Guide vanes 175 diverging in the direction of flow (the arrow 177 in Fig. 4) may be mounted near the outlet 168 with a view to distributing the fluid laterally and to preventing all fluid to pass directly to the centrally disposed outlet 168. This means spreads the cooling effect over the partition 154.

The point of connection between the conduit 170 and the air intake 174 is located before the carburetor 176 of the engine whereby the fuel-charged air from the conduit 170 will be mixed with the fresh air from the air cleaner 178 in the intake and particularly also in the carburetor.

It is not necessary but preferable to employ the same liquid for the vaporization in the refrigerator as that used as fuel for the engine. If the same liquid is used, the liquid tank 108 may be substituted by the fuel tank of the internal combustion engine or be connected with said tank or with a fuel pump delivering fuel from the tank to the carburetor. Fig. 2 illustrates a branch-pipe 180 from the outlet of the tank 108 to the pressure side of a fuel pump 182 having its inlet connected to the fuel tank 184 by a pipe 186. The pressure side of the pump is also connected with the carburetor in a conventional manner by a conduit 188, whereby the pump delivers fuel to the tank 108 as well as to the carburetor. A three-way valve 190 is mounted between the outlet of the tank 108, the branch pipe 180 and the supply conduit 146, and said valve can be set to allow feed of the tank with fuel from the pump 182 or supply of fuel to the refrigerator through the supply conduit 146 at closed branch pipe 180, selectively.

A further detail of the illustrated apparatus is a heat-insulated cover 192 removable to permit insertion of food, bottles or other objects to be cooled into the box 104. Clips 194, 196 for holding the neck and the body of a bottle in place in the box may be mounted on the bottom 120 thereof.

The refrigerator may be mounted at any suitable place in a motor car, for example, in the luggage space or below the seats in the cabin. Special support means may be used for securing the refrigerator to the car such as legs 198 secured to the bottom of the shell 100, intermediate cushions 200 of rubber being held in place by bolts 202 attaching the legs to said shell. Similar cushions 201 may be used between the feet 203 of the supports and the car 205.

A throttle valve 204 operable by a lever 206 may be mounted in the air intake 174 to enable control of the flow through the conduit 170 and thus of the temperature in the refrigerator box. Screens 210 of wire or perforate sheet metal may be inserted in the conduit 170 to protect the apparatus for back-fire from the engine.

The operation of the apparatus is substantially as follows:

Fuel such as gasoline serving as a refrigerating liquid is supplied through the conduit 137 to the channel-shaped reservoir 126 and from there to the reservoir 124 by the pipe 130. The surface of the fuel is held at the level 144 by the float 140 and the valve 142. Fuel is drawn up by capillary action into the netting 148 and the wick members 150, the latter contributing to an effective distribution of liquid to the wire netting so that the netting is maintained in a moist or wet condition. Due to the suction in the intake 174 of the engine 172 a flow of air is obtained in the refrigerator, as shown by the arrows 208 and 177 in Figs. 3 and 4, from the air inlet 162 through the pre-cooling chamber 168, passage 164, evaporation chamber 156 passed the wire netting 148, passages 166 and chamber 160 to the conduit 170 and thence to the internal combustion engine. While the air is passing the wire netting 148 the liquid fuel is vaporized rapidly to form a gaseous mixture with the air, heat required for this vaporization being taken from the netting and the surrounding walls of the chamber 156 and thus from the wall 152 too. The wire netting 148 which is held in intimate contact with the bottom 120 of the refrigerating box 104, particularly by being welded thereto at interspaced points or lines, cools said bottom 120 efficiently, and this refrigerating effect is maintained by fresh liquid being fed from the reservoirs 124, 126 and vaporized, the heat being rapidly transferred from the box 104 due to the well heat-conducting material of the wire netting. The cold gaseous fuel admixed to the air cools both the wall 152 forming the top of the pre-cooling chamber 158 and the wall 154 forming the bottom thereof, the latter refrigeration taking place as the gaseous mixture passes the exhaust chamber 160.

Thus the refrigeration occurs in two steps, i. e. by pre-cooling the air prior to the admixture of the fuel vapor, and by the vaporization of the liquid fuel distributed to and by the wire sheets 148.

A variable amount of gaseous mixture may be taken from the refrigerator by adjusting the throttle valve 204. It is also possible to supply all air-gas mixture required for the internal combustion engine from the refrigerator, the normal air intake in such case being closed. Thus the refrigerator can substitute the carburetor of the engine, the conduit 170 being connected to the intake manifold of the engine.

A rapid start of the refrigeration or an acceleration thereof may be obtained by an injector supplying a spray of liquid in the evaporation chamber 156 as indicated in Fig. 2a. The injector has a piston 212 in a cylinder 214, a suction pipe 216 immersing in the liquid in the fuel tank, and an outlet tube 218 ending with a nozzle 220 in the chamber 156. A non-return valve 222 in the suction pipe prevents return of liquid to the tank from the cylinder, and a non-return valve 224 prevents suction of air from the chamber 156 into the injector cylinder. A spring 226 is adapted to return the piston after depression thereof by a handle 228.

What I claim is:

1. Refrigeration apparatus including an internal combustion engine provided with a carburetor, an evaporation device confining an evaporation chamber and a liquid chamber, the evaporation device having a storage space bordered by refrigerated walls of the device, a liquid absorbent material in said evaporation chamber in a position to receive liquid for evaporation from said liquid chamber, means for conducting air to said evaporation chamber past said liquid absorbent material to entrain vapor therefrom, and means to connect the evaporation chamber with the air intake of said engine at a point in advance of said carburetor.

2. Refrigeration apparatus including an internal combustion engine with an air intake, an evaporation device confining an evaporation chamber, a liquid absorbent member of a well heat-conducting material in said chamber and in contact with a wall of the latter, a storage space bordered by said wall, means to feed liquid fuel to said member, means for conducting air to said evaporation chamber past said liquid absorbent member to cause vaporization of the liquid and to entrain the vapor therefrom, and means connecting the evaporation chamber with said air intake to generate the flow of air past the absorbent member.

3. Refrigeration apparatus including an internal combustion engine with an air intake, an evaporation device confining an evaporation chamber, a liquid absorbent member of a well heat-conducting material in said chamber and in contact with a wall of the latter, a storage space bordered by the refrigerated walls of said device, means to feed liquid fuel to said member, means for conducting air to said evaporation chamber past said liquid absorbent member to cause vaporization of the liquid and to entrain the vapor therefrom, a pre-cooler in said air conducting means to transfer heat from the entering air to the air-vapor mixture created at said vaporization and means connecting the evaporation chamber with the air intake of the engine.

4. Refrigeration apparatus comprising an internal combustion engine with an air intake, an evaporation device including a shell, box-like members of liquid absorbent material mounted in said shell and one within the other in spaced relation to form evaporation compartments, one between the shell and the exterior box-like member and another between the box-like members said evaporation compartments communicating with one another and with said air intake and an outlet for air-vapor mixture, a refrigerator cabinet in the interior box-like member, an evaporator container in said cabinet, a liquid chamber in the shell, said liquid absorbent material reaching into said liquid chamber, means to conduct liquid to said liquid chamber, a conduit connecting said liquid conducting means with the evaporation container, an expansion valve in said conduit, and means to generate a flow of air through said evaporation compartments to accelerate the evaporation of liquid from the absorbent material.

5. A refrigeration apparatus as claimed in claim 4 and further comprising a conduit connecting the evaporation space of said evaporation container with said outlet of the evaporation compartments and means to selectively control the discharge of air-vapor mixture from said container and from the evaporation compartments respectively and the relation therebetween.

6. Refrigeration apparatus including an internal combustion engine, an evaporation device having an evaporation chamber, a refrigerator cabinet, a fine-mesh wire-netting in heat-conducting contact with a wall of said cabinet, means to feed liquid fuel to said netting, means to admit air to said evaporation chamber, and means connecting said chamber with the suction side of the internal combustion engine to generate a flow of air through the evaporation chamber for supplying air-vapor mixture to said engine.

7. A refrigeration apparatus as claimed in claim 6 and further including a pre-cooler for the air to the evaporation chamber, said pre-cooler being formed by superimposed interspaced partitions between the evaporation chamber and an exhaust chamber for the air-vapor mixture.

8. A refrigeration apparatus for internal combustion engines comprising a refrigerator box for the objects to be cooled, a casing forming a sealed space outside said refrigerator box, said casing including liquid reservoirs at opposite sides of the sealed space, liquid absorbing wire netting members located in the sealed space in intimate contact with said refrigerator cabinet and with portions thereof immersed in the liquid reservoirs, means to maintain a constant liquid level in the reservoirs, means to admit air to the sealed space and means to conduct vapor air mixture from the space to be used as fuel in the internal combustion engine.

9. Refrigeration apparatus including an internal combustion engine with an air intake, an evaporation device confining an evaporation chamber, said evaporation device having a storage space bordered by refrigerated walls of the device, a liquid absorbent member of a well heat-conducting material in said chamber, means to feed liquid fuel to said member including an injector for spraying liquid into the evaporation chamber, means for conducting air to said evaporation chamber past said liquid absorbent member to cause vaporization of the liquid and to entrain the vapor therefrom, and means connecting the evaporation chamber with said air intake to generate the flow of air past the absorbent member.

References Cited in the file of this patent
UNITED STATES PATENTS

| | | |
|---|---|---|
| 767,557 | Brockoven | Aug. 8, 1905 |
| 1,028,298 | Stafford | June 4, 1912 |
| 1,393,226 | Leavitt | Oct. 11, 1921 |
| 1,473,593 | Kirschmann | Nov. 6, 1923 |
| 1,822,586 | Eckles | Sept. 8, 1931 |
| 1,864,608 | Munters et al. | June 28, 1932 |
| 1,879,358 | Lilly | Sept. 27, 1932 |
| 2,290,893 | Phillips | July 28, 1942 |
| 2,565,767 | Gaskell | Aug. 28, 1951 |